Oct. 4, 1932.   H. E. LIPPERT   1,881,025
CONTROL SYSTEM FOR MOTOR VEHICLES
Filed Feb. 5, 1929
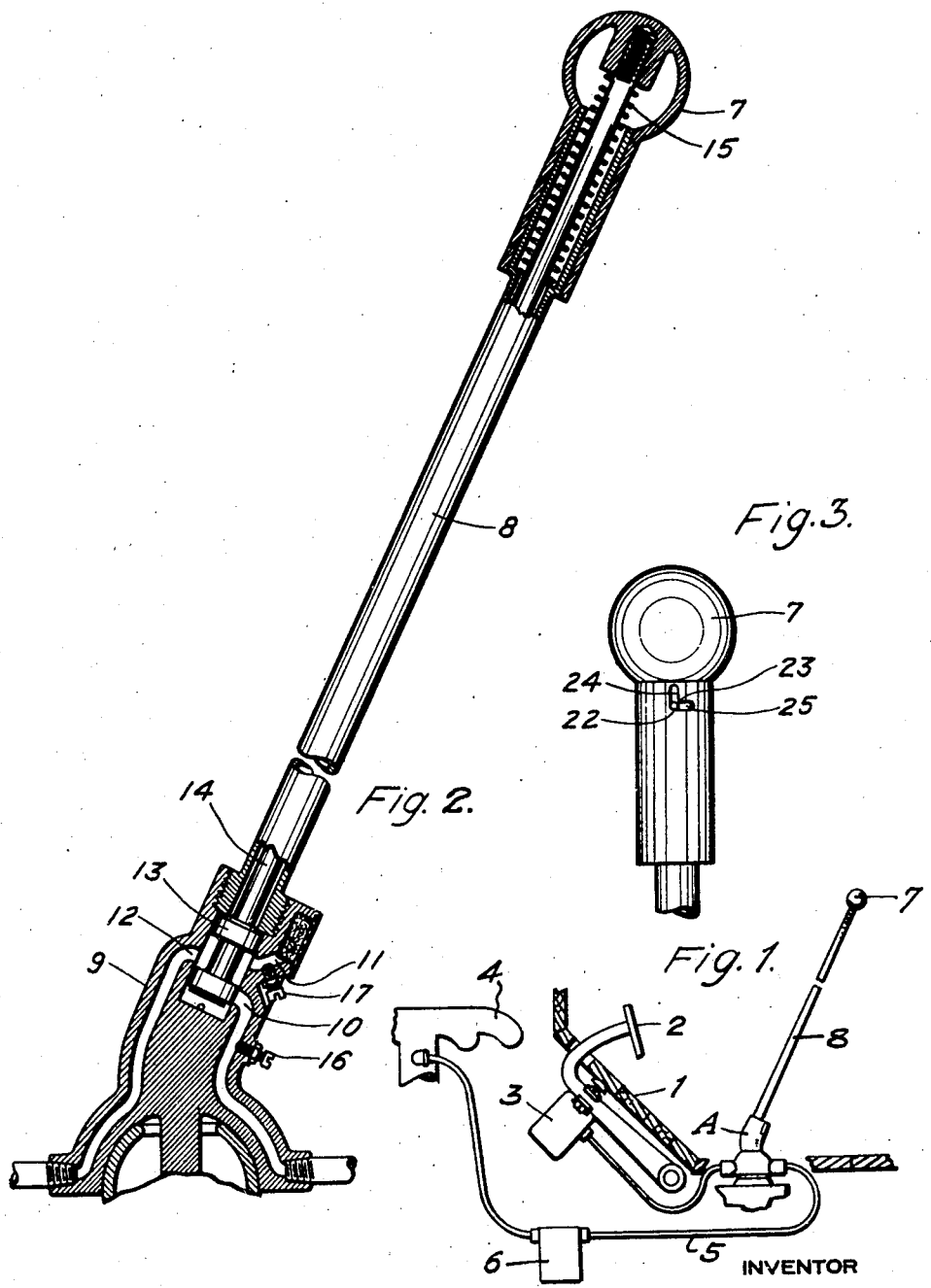
INVENTOR
Henry E. Lippert Patented Oct. 4, 1932

1,881,025

UNITED STATES PATENT OFFICE

HENRY E. LIPPERT, OF PITTSBURGH, PENNSYLVANIA

CONTROL SYSTEM FOR MOTOR VEHICLES   REISSUED

Application filed February 5, 1929. Serial No. 337,711.

This invention relates particularly to a common control for actuating the transmission and power operated clutch of a motor vehicle, but is not limited thereto. The prime object of the invention is to simplify the controlling of a motor vehicle. This control system relieves the strain on women operators and is also useful to persons having a crippled leg. Other objects and advantages will be apparent during the course of the following description.

Similar reference characters in the different figures of the drawing indicate corresponding elements or features of construction herein referred to.

Fig. 1 is a fragmentary elevational view of a motor vehicle equipped with an embodiment of the invention.

Fig. 2 is a part sectional view of the common control illustrated in Figure 1.

Fig. 3 is a view of the upper end of the common control; and illustrates the means for rendering the clutch actuating part of the common control inoperative whereby said control can be used to actuate the transmission only.

In Figure 1 the numeral (1) designates the toeboard of an automobile, and (2) the usual clutch pedal that may be operated manually or by the fluid motor (3). (I do not limit myself to the type or location of the fluid motor shown and described in this application, and it should be understood that any type of fluid motor can be used if its object is to actuate the clutch.) The fluid motor (3) is actuated by the suction created in the manifold (4) of the vehicle engine (not shown) and is connected to the manifold (4) by the conduit (5). (I have shown and described my invention in connection with the manifold of the vehicle engine, but any source of suction can be used.) A valve A in the conduit (5) controls communication between the manifold (4) and the fluid motor (3).

To insure instant release of the clutch when the control valve A is opened I have provided the reservoir (6) in the conduit (5) between the control valve A and the manifold (4). When the vehicle engine is running and the valve A is closed the pressure in the fluid motor (3) is the same as atmospheric pressure and an almost complete vacuum is maintained in the reservoir (6). When the valve A is opened, making a communication between the reservoir (6) and the fluid motor (3), the pressure in both tend to neutralize and instantly the fluid motor (3) actuates.

The control valve A is opened by downward movement of a telescopically mounted section 7 at the upper end of the common control 8. It can be seen in Figure 2 that the valve casing (9) of the valve A forms the lower portion of the common control (8), and has a lower port (10) in communication with the manifold (4). The upper port (11) is in communication with the air. The port (12), located between the ports (10) and (11), is in communication with the fluid motor (3). A spool valve (13) is slidably mounted in the valve casing (9) and makes communication between the fluid motor port (12) and the air port (11), or the fluid motor port (12) and the vacuum port (10). Secured to the spool valve (13) is a rod (14) which extends upwardly through the common control (8) and is secured at its top end to the telescopically mounted section (7). The spool valve (13) is normally held to make communication between the fluid motor port (12) and the air port (11) by a spring (15) positioned in any desirable location in the common control (8). Downward movement of the telescopically mounted section (7) breaks communication between the fluid port (12) and the air port (11), and makes communication between the fluid motor port (12) and the vacuum port (10). (I do not limit myself to the valve design shown and described in this application, but any suitable valve may be employed.)

To actuate the clutch at the desired rate of speed I have provided the adjusting screws (16) and (17) in vacuum and air ports respectively for varying the cross-sectional area of said ports. By decreasing the area of the air port (11) with the screw (17) the clutch is engaged slowly and by increasing the area the clutch is engaged rapidly. By decreasing the area of the vacuum port (10) with the screw (16) the clutch is released slowly and by increasing the area the clutch is released rapidly.

Occasionally it may be desirable or necessary to render the hand control for actuating the clutch by power inoperative, and use the conventional pedal 2 for disengaging the clutch by manual effort. For this purpose I have provided a pin (22) fixed to the common control (8) and adapted to move in the L shaped slot (23) in the telescopically mounted section (7). In operating position the pin (22) slides in the vertical portion (24) of the L-shaped slot (23). To prevent the clutch from being operated by power, the telescopically mounted section (7) is turned until the pin (22) engages the lateral portion (25) of the L shaped slot (23) which prevents the vertical movement of the telescopically mounted section (7). From the structure described in this paragraph it is apparent that the common control may be used to actuate both the transmission and clutch of the vehicle, or be used as a gear shift lever only.

Although I have shown and described a compact embodiment of my invention that can be cheaply manufactured, it should be understood that the invention is not limited to this particular construction, and that modifications of the separate parts and various arrangements of the different elements may be made without departing from the spirit and scope of the invention.

Having now described my invention, what I claim as new and desire to secure by Letters Patent, is:

In a control system for motor driven vehicles, a pedal for disengaging the clutch of the vehicle by manual effort, a vacuum operated motor for disengaging the clutch by power, a source of suction, means connecting the vacuum operated motor with the source of suction including a conduit providing communication therebetween and also providing a valve interposed in the conduit, separate and apart from the vacuum operated motor, for controlling communication therebetween, said means having an atmosphere inlet therein intermediate the vacuum operated motor and the source of suction for admitting atmosphere to the vacuum operated motor, means arranged at the atmosphere inlet to vary the rate at which atmosphere is admitted to the vacuum operated motor and thereby vary the speed of engagement of the clutch, common manually operable means for actuating the valve and thereby control the vacuum operated motor and for actuating a second element of the vehicle in controlling the latter, means operatively connecting the common manually operable means with the valve whereby movement of the common manually operable means will directly actuate the valve, and means for rendering both the valve inoperative to place the vacuum operated motor in communication with the source of suction and the common manually operable means inoperative to control the vacuum operated motor whereby the common manually operable means can be used to actuate said second element of the vehicle only.

In testimony whereof I have hereunto set my hand.

HENRY E. LIPPERT.